United States Patent [19]
Keesman et al.

[11] Patent Number: 5,805,220
[45] Date of Patent: Sep. 8, 1998

[54] SYSTEM FOR TRANSMITTING A PLURALITY OF VIDEO PROGRAMS SIMULTANEOUSLY THROUGH A TRANSMISSION CHANNEL

[75] Inventors: Gerrit J. Keesman; Petrus J. Van Otterloo, both of Eindhoven, Netherlands

[73] Assignee: U.S. Philips Corporation, New York, N.Y.

[21] Appl. No.: 732,311

[22] PCT Filed: Feb. 22, 1996

[86] PCT No.: PCT/IB96/00138

§ 371 Date: Oct. 22, 1996

§ 102(e) Date: Oct. 22, 1996

[87] PCT Pub. No.: WO96/26608

PCT Pub. Date: Aug. 29, 1996

[30] Foreign Application Priority Data

Feb. 22, 1995 [EP] European Pat. Off. .............. 95400374

[51] Int. Cl.$^6$ ................................................. H04N 7/08
[52] U.S. Cl. ...................... 348/385; 348/382; 348/388; 370/468
[58] Field of Search .................................. 348/385, 382, 348/388, 397, 398; 370/468, 473, 477, 537

[56] References Cited

U.S. PATENT DOCUMENTS

| 5,115,309 | 5/1992 | Hang | 348/388 |
| 5,600,365 | 2/1997 | Kondo | 348/8 |
| 5,606,369 | 2/1997 | Keesman | 348/385 |
| 5,621,463 | 4/1997 | Lyons | 348/347 |
| 5,625,416 | 4/1997 | Tseng | 348/388 |
| 5,627,825 | 5/1997 | Barraclough | 370/260 |

*Primary Examiner*—Howard W. Britton
*Attorney, Agent, or Firm*—Laurie E. Gathman

[57] ABSTRACT

System for transmitting n video programs simultaneously through a transmission channel having a predetermined bitrate, comprising in cascade a decoding assembly and an encoding assembly. The decoding assembly consists of n parallel decoding means provided in parallel for decoding the coded input signals corresponding to said programs, and the encoding assembly consists of n encoding means being in cascade with each of said decoding means and each comprising a quantizer having a variable step size and a variable length encoder. The system also comprises means for controlling the step sizes of said encoding means in dependence upon their respective output bitrates, and these control means are also provided for controlling the output bitrates of said encoding means in dependence upon complexity values associated to the coded input signals of each decoding means with respect to the joint complexity of the plurality of said coded signals.

3 Claims, 2 Drawing Sheets

SYSTEM FOR TRANSMITTING A PLURALITY OF VIDEO PROGRAMS SIMULTANEOUSLY THROUGH A TRANSMISSION CHANNEL

BACKGROUND OF THE INVENTION

The invention relates to a system for transmitting a plurality of video programs simultaneously through a transmission channel having a predetermined total bitrate, comprising:

(a) in cascade a decoding assembly and an encoding assembly, said decoding assembly consisting of an identical plurality of decoding means provided in parallel for decoding n coded input signals corresponding to said programs and each comprising in cascade a demultiplexing circuit and a decoder, and said encoding assembly consisting of an identical plurality of encoding means being in cascade with said decoding means and each comprising in series a quantizer having a controllable step size and a variable length encoder (b) means for combining the output bitstreams of said encoding means to an output channel bitstream;

(c) control means for controlling respective step sizes of said plurality of encoding means in dependence upon the respective output bitrates of said encoding means.

Television programs are often composed by means of a combination of video material from different sources, and particularly it may occur that they are available in an encoded digital form. If the bitstreams corresponding to each of these digital signals are merely switched, there will be no guarantee that the buffer states are correct. Moreover, when different programs are combined, the bitrates can be very different per program. In practice, such situations lead to bitrate peaks, and the picture quality of the encoded television signals will consequently often vary, being noticeably poor for complicated picture scenes.

The patent of the U.S. Pat. No. 5,115,309 describes a system for transmitting simultaneously a plurality of digital video data within a transmission channel having a predetermined bitrate. This system indeed comprises a plurality of parallel encoders, a circuit for controlling in dependency upon the output bitrates of these encoders the step size of a quantization step implemented in each encoder before the encoding step, and a device for combining the output bitstreams of said encoders to a single channel bitstream. However, when the video data to be transmitted are already available in the form of digital programs with very different output bitrates and the achievement of the combining step without impairing the final picture quality is consequently more difficult, such a system does not indicate any practical technical solution which could be implemented in that situation.

SUMMARY OF THE INVENTION

It is an object of the invention to propose a system for transmitting a plurality of video programs simultaneously through a transmission channel with which a higher picture quality is achieved whatever the discrepancy between the bitrates of the programs to be combined and the complexity of the picture scenes.

To this end the system according to the invention is characterized in that said control means are also provided for controlling the output bitrates of said encoding means in dependance upon complexity values associated to the coded input signals of each decoding means with respect to the joint complexity of the plurality of said coded signals.

The invention is based on the recognition that, in spite of the possible very different input bitrates of the programs, bitrate peaks can be avoided and the sum of the output bitrates can be kept constant if transcoders with an appropriate accurate bitrate control, including an improved complexity estimation, are implemented.

In a first advantageous embodiment, in which each picture of said video programs is, according to the MPEG standard, an intraframe coded or a predictively coded or a bidirectionally predictive coded picture, said system is characterized in that it comprises a common bitrate adjusting circuit for applying a respective bitrate target value to each of the control means in dependence upon the complexities of the corresponding video programs, said adjusting circuit comprising computing means for gathering bitstreams and quantization parameters available in said input bitstreams and determining said complexities, a summing device for adding these complexities, dividers of each complexity by their sum, and multipliers of the obtained ratios by the channel bitrate computed for each of said three types of picture in said computing means, the respective outputs of said multipliers being the target values sent to said control means of each of said encoding means.

In another embodiment, in which each input picture of said programs is, according to the MPEG-standard, an intraframe coded or a predictively coded or a bidirectionally predictive coded picture, said system is characterized in that it comprises a common bitrate adjusting circuit for applying a respective bitrate target value to each of the control means in dependance upon the complexities of the corresponding video programs, said adjusting circuit comprising computing means for gathering bitstreams and quantization parameters available at the outputs of said demultiplexing circuits and of said decoding devices and determining the complexity of each of said decoded signals, a summing device for adding these complexities, dividers of each complexity by their sum, and multipliers of the obtained ratios by the channel bitrate computed for each of said three types of picture in said computing means, the respective outputs of said multipliers being the target values sent to said control means of each of said encoding means.

These aspects of the invention will be apparent from and elucidated with reference to the embodiments described hereinafter.

DETAILED DESCRIPTION OF THE PREFERRED EMBODIMENTS

Figure 1:
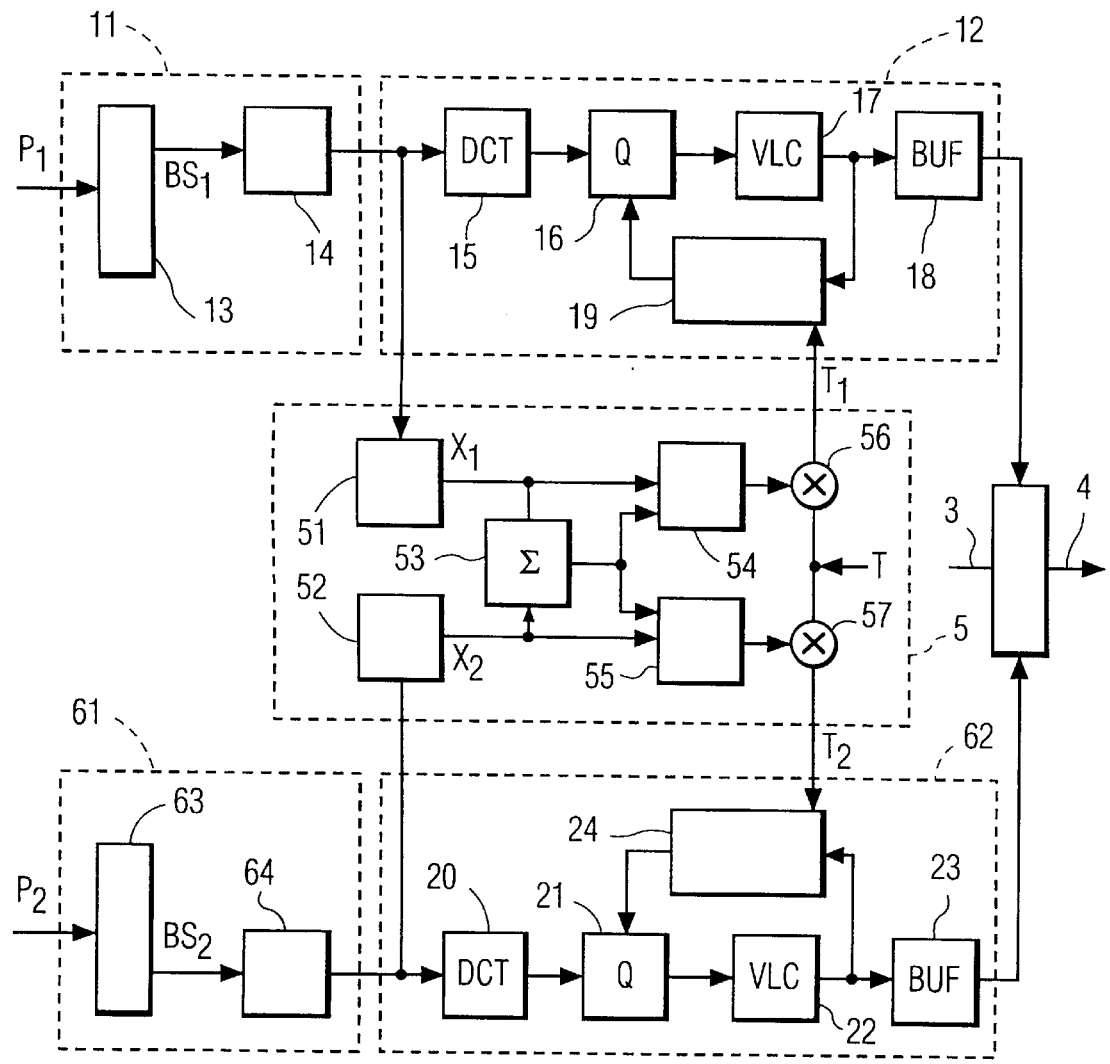
FIG. 1 shows an embodiment of a system for transmitting a plurality of video programs according to the invention.

The system shown in FIG. 1 is intended to allow the transmission of two digital programs over one channel, but it must be understood that an increased number of such programs should be transmitted in the same manner without departing from the scope of the invention.

The illustrated system comprises two transcoding devices, to which digital programs in the form of encoded signals $P_1$ and $P_2$ are applied. Each transcoding device comprises in cascade a decoding device (11, 61) and an encoding device (12, 62). Said decoding devices 11 and 61 constitute a decoding sub-assembly, and said encoding devices 12 and 62 constitute an encoding sub-assembly. Each decoding device (11 and 61) comprises in cascade a demultiplexing circuit (13, 63) and a decoder (14, 64). The demultiplexing circuits 13 and 63 generate bitstreams BS$_1$ and BS$_2$. The decoders 14 and 64 are conventional and comprise for example, in series, a variable length decoder, an inverse quantizing circuit and a motion compensation stage (not shown). Each encoding device (12 and 62) comprises for example a frequency transformer (15, 20), a quantizer (16, 21) having a variable step size, a variable length encoder (17, 22), an output buffer (18, 23) and a bitrate control circuit (19, 24). The bitrate control circuits 19 and 24 are known per se and no longer described.

The two output bitstreams of the transcoding devices (11-12) and (61-62) are combined in a multiplexer 3 to one channel bitstream having a channel bitrate T and applied to a transmission channel 4. This bitrate T corresponds, for a picture, to the addition of the target values T$_1$ and T$_2$ of each encoding device (i.e. the average number of applied bits per picture for each encoding device 12 or 62).

To these transcoding devices (11-12) and (61-62), intented to suppress or minimize the bitrate peaks of original digital programs, a joint bitrate adjusting circuit 5 is associated. This adjusting circuit 5 determines for the decoded input signal of each encoding device 12 or 62 a complexity value (X$_1$ for the first encoding device 12 and X$_2$ for the second encoding device 62), which usually equals the product of the number of bits used for a picture and the average step size over it, and is representative of the complexity of the current picture scenes of each program. This complexity value will modify the target value of each transcoding device (of each of the N transcoding devices for a system comprising in parallel N transcoding devices in view of the transmission of N digital programs within a single transmission channel).

In a possible embodiment of the adjusting circuit 5, the complexity values X$_1$ and X$_2$ should be obtained by subjecting each applied television signal to a preanalysis, in preanalysis circuits 51 and 52. Such preanalysis circuits then comprise in series, for example a picture transformer, a quantizer having a fixe step size, a variable length encoder, and a counter for counting the number of bits obtained for each picture (not shown). The two complexity values X$_1$ and X$_2$ thus obtained are added together in a summing device 53. Subsequently, the relative complexity for each transcoding device is determined in dividers 54 and 55, which compute:

$$\frac{X_1}{X_1+X_2} \text{ and } \frac{X_2}{X_1+X_2}$$

respectively.

Finally, the target values T$_1$ and T$_2$ (T$_1$ to T$_N$ when the system includes N transcoding devices) are computed by means of multipliers 56 and 57, by multiplying the available channel bitrate T (expressed in bits/picture) by said relative complexity, and applied to the control circuits 19 and 24. It now holds that the target values are:

$$T_1 = \frac{X_1}{X_1+X_2} \cdot T \text{ and } T_2 = \frac{X_2}{X_1+X_2} \cdot T \qquad (1)$$

If there are N digital programs, it holds for the target value T$_n$ (n=1 ... N) which is applied to the n-th encoding device (of the n-th transcoding device):

$$T_n = \frac{X_n}{\sum_{n=1}^{N} X_n} \cdot T \qquad (2)$$

The transmitting system therefore allows to compensate for the temporarily too high or too low bitrates of the programs and to allocate a bitrate to each of these programs in proportion with the current complexity and according to the available channel bitrate. A picture quality is then obtained which is substantially equal for all signals. Obviously, it is alternatively possible to allocate a distinct picture quality to the programs. This is achieved by influencing the relative complexity of the signals in a predetermined manner, for example by modifying the relative complexities in the following manner:

$$\frac{\alpha_1 X_1}{\alpha_1 X_1 + \alpha_2 X_2} \text{ and } \frac{\alpha_2 X_2}{\alpha_1 X_1 + \alpha_2 X_2} \qquad (3)$$

respectively, in which $\alpha_1$ and $\alpha_2$ are constants.

Figure 2:
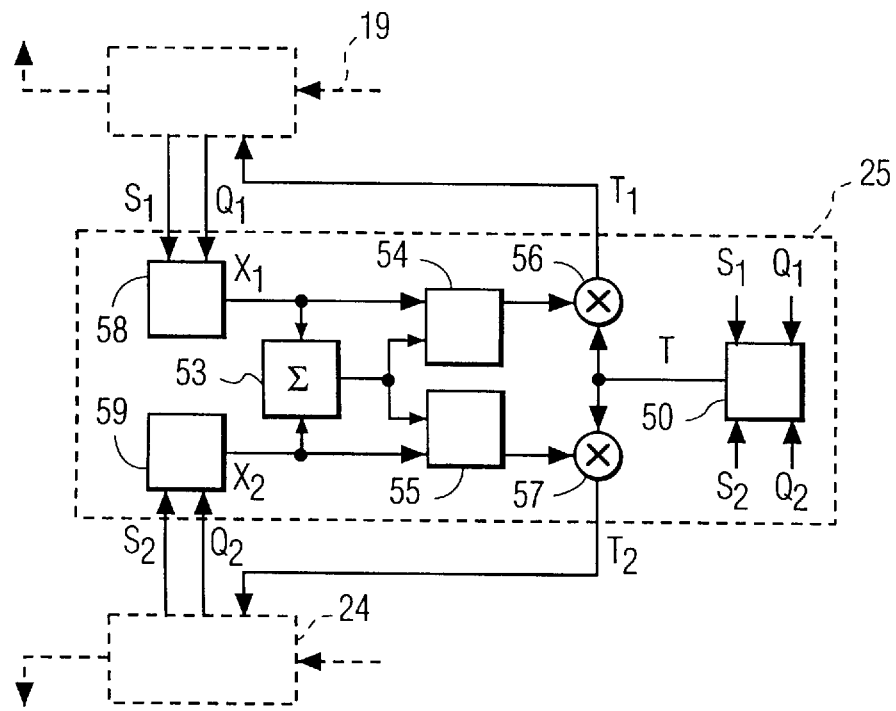

FIG. 2 shows a further embodiment of the joint bitrate adjusting circuit, now referenced 25. The decoding and encoding devices (not further shown) are assumed to be for example MPEG decoders and encoders. The MPEG standard, proposed by the International Standard Organization's Moving Picture Experts Group for the multiplexed, compressed representation of video and associated audio signals, is described in many documents, and for example in the article "La norme MPEG est prête pour la diffusion TV. . . et TVHD", published by the french review "Electronique International Hebdo", Feb. 2nd, 1995, n°167, pp. 20–21. As may be known, the digital signals, according to this standard, are transmitted in the form of Groups of Pictures (GOPs), each GOP comprising an intraframe coded picture, or I picture, a number of predictively coded pictures, or P pictures, and a number of bidirectionally predictive coded pictures, or B pictures. In this case, the adjusting circuit 25 may now comprise:

(A) computing means 58 and 59 for computing the complexities X$_1$ and X$_2$ (the complexities X$_1$ to X$_N$ if there are N digital programs) of each input signal of the encoders. As an alternative to the preanalysis circuits 51 and 52 shown in FIG. 1, the complexity value is now determined with reference to the number of bits S which is spent on coding the previous picture and a quantization parameter Q which is representative of the average step size with which this picture is quantized (the product of S and Q is a representative measure of the complexity of said input signals). Both values (S$_1$, Q$_1$) and (S$_2$, Q$_2$) are applied to the adjusting circuit 25 by the bitrate control circuits 19 and 24 of each encoder. By separately determining this product for each type of picture (I, P and B), three complexity values X$_I$, X$_P$ and X$_B$ are obtained for each transcoding device (n=1, 2 when only two transcoding devices are considered, and n=1 to N with N transcoding devices):

$$X_{In}=S_{In} \times Q_{In}, X_{Pn}=S_{Pn} \times Q_{Pn} \text{ and } X_{Bn}=S_{Bn} \times Q_{Bn} \qquad (4)$$

Alternative formulas are possible. It is for example possible to emphasize the influence of the quantization value on the complexity value as in, for example:

$$X(D)=S(D) \times Q(D)^\alpha (\alpha>1) \text{ or in: } X(D)=S(D) \times e^{Q(D)} \qquad (5)$$

in which the index D refers to the type of picture (I, P, B).

(B) a summing device 53 and dividers 54, 55 for determining, for each type of picture, the relative complexity of each input signal in accordance with the formula:

$$\frac{X_{In}}{\sum_{n=1}^{N} X_{In}}, \frac{X_{Pn}}{\sum_{n=1}^{N} X_{Pn}}, \text{ and } \frac{X_{Bn}}{\sum_{n=1}^{N} X_{Bn}} \quad (6)$$

(C) computing means 50 for computing, for each type of picture, the total number of bits T for the subsequent image of the joint signals. For example the following computations can be performed:

$$T_I = \frac{R}{1 + \frac{n_P \cdot X_P}{X_I \cdot K_P} + \frac{n_B \cdot X_B}{X_I \cdot K_B}}, \quad (7)$$

$$T_P = \frac{R}{n_P + \frac{n_B \cdot K_P \cdot X_B}{K_B \cdot X_P}}$$

$$T_B = \frac{R}{n_B + \frac{n_P \cdot K_B \cdot X_P}{K_P \cdot X_B}}$$

in which $n_P$ and $n_B$ represent the number of P and B pictures still to be encoded in the GOP and $K_P$ and $K_B$ are specific system constants.

In formula (7), $X_I$, $X_P$ and $X_B$ represent a joint complexity of the signals corresponding to the programs (the pictures corresponding to each program are then considered to jointly form a superpicture). This joint complexity value can be constituted by:

$$X_I = \sum_{n=1}^{N} S_{In} \times Q_{In}, \quad (8)$$

$$X_P = \sum_{n=1}^{N} S_{Pn} \times Q_{Pn} \text{ and}$$

$$X_B = \sum_{n=1}^{N} S_{Bn} \times Q_{Bn}$$

or by:

$$X_I = \sum_{n=1}^{N} S_{In} \times \sum_{n=1}^{N} Q_{In}, \quad (9)$$

$$X_P = \sum_{n=1}^{N} S_{Pn} \times \sum_{n=1}^{N} Q_{Pn} \text{ and}$$

$$X_B = \sum_{n=1}^{N} S_{Bn} \times \sum_{n=1}^{N} Q_{Bn}$$

To this end, the computing means 50 receive from each encoder its spent number of bits ($S_1$ and $S_2$) and the average step size ($Q_1$ and $Q_2$). In said formula (7), R is the remaining number of bits which is allocated to the joint GOPs, or super GOPs (its initial value is the number of available bits/super GOP).

(D) multipliers 56 and 57 for distributing the target value T for the superpicture among the two encoders (the N encoders if N transcoding devices are considered) in proportion with the relative complexity of the picture of the corresponding programs. In a formula (9) this is expressed by:

$$T_{In} = \frac{X_{In}}{\sum_{n=1}^{N} X_{In}} \times T_I,$$

$$T_{Pn} = \frac{X_{Pn}}{\sum_{n=1}^{N} X_{Pn}} \times T_P, \text{ and}$$

$$T_{Bn} = \frac{X_{Bn}}{\sum_{n=1}^{N} X_{Bn}} \times T$$

In the manner thus described, the bitrate control circuit 19 of the encoding device 12 receives a target value $T_{I1}$, $T_{P1}$ and $T_{B1}$ for each type of picture (I, P or B) and will attempt to meet this target. In a corresponding manner, the bitrate control circuit 24 of the encoding device 62 receives a target value $T_{I2}$, $T_{P2}$ and $T_{B2}$ and also attempts to meet this target. Thus it holds for each encoder that the applied target value is dependent on the relative complexity of the picture of one program with respect to the other one (to the (N−1) other ones if more than two programs are considered).

Figure 3:
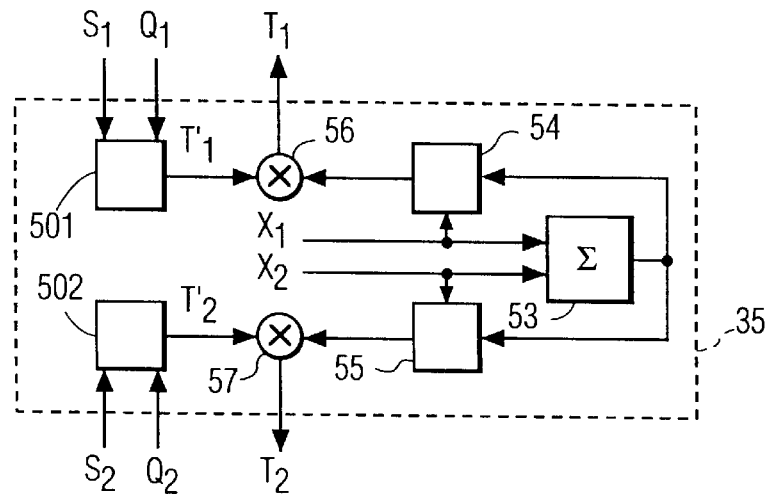
FIGS. 2, 3 and 4 show further embodiments of a joint bitrate adjusting circuit for such a transmitting system.

FIG. 3 then shows an alternative embodiment of the adjusting circuit, for use in place of the circuit 25 shown in FIG. 2 (identical reference numerals represent identical functions). The adjusting circuit, now referenced 35, differs from the one shown in FIG. 2 in that the computing means 50 of FIG. 2 are now split up into two identical computing devices 501 and 502 which compute, for each program, the number of bits for the next picture as if the full channel bitrate were available for one program. The afore-mentioned formula (7) applies to the computation, in which $X_I$, $X_P$ and $X_B$ now represent the complexity value (instead of the joint complexity) of the corresponding signal. The number of bits thus computed is denoted by $T'_1$ and $T'_2$ in FIG. 3. It is this number which is multiplied (in mutipliers 56 and 57) by the relative complexity of the corresponding signal. The relative complexity is obtained in the same manner (summing device 53, dividers 54 and 55) as in FIG. 2.

Figure 4:
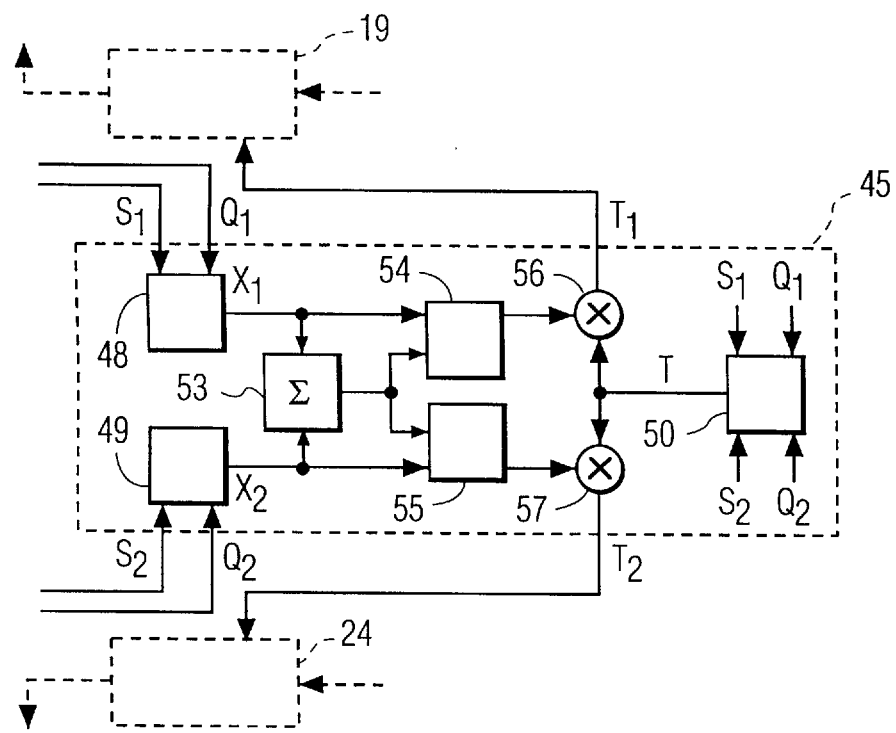

Another embodiment of the adjusting circuit is possible, as illustrated for example in FIG. 4 showing an adjusting circuit for use in the place of the circuit shown in FIG. 2 or FIG. 3. Each encoding device 12 or 62 was using a pre-analysis predicting how many bits were required for each subdivision of the current picture to be coded. Since the transcoding devices receive already coded signals, sent to the decoding devices of these transcoding devices, the computing means (58,59) of FIG. 2 or the computing means (501,502) of FIG. 3 can now be replaced, in the adjusting circuit 45 of FIG. 4, by modified computing means 48 and 49, the inputs of which are now connected to receive these coded signals, for gathering the bitstreams and quantization parameters, for example by reading the values of S and Q available in output buffers (not shown) of the previous encoders with which the input coded signals have been obtained. Then the computing means 48 and 49, using these values $S_1$, $Q_1$, $Q_2$, generate $X_1$ and $X_2$, or $T'_1$ and $T'_2$, as previously indicated with reference to the adjusting circuit 25 or 35 respectively.

Another alternative embodiment of the adjusting circuit is also possible. As an MPEG-compatible transcoding device includes a decoding sub-assembly comprising in cascade a demultiplexing circuit, which generates a coefficient bit-stream (and other signals not useful here), and a decoding device, which uses the quantization parameters included in said bitstream, the inputs of the computing means 48 and 49 of FIG. 4 may now be connected to appropriate outputs of said demultiplexing circuits and said decoding devices, for gathering the bitstreams and quantization parameters. Then the computing means 48 and 49 compute $S_1$, $Q_1$, $S_2$, $Q_2$, and generate $X_1$ and $X_2$, or $T'_1$ and $T'_2$, as previously indicated.

With these alternative embodiments, the previous preanalysis is no longer required, the necessary data being already available at the input of or in the decoding part of the transcoding devices. In FIG. 4, the other circuits than computing means 48 and 49 have the same references as for example in FIG. 2, identical reference numerals representing identical functions.

It is thus possible to obtain a more accurate estimation of the complexity of the current picture. Because the incoming pictures of the system will be decoded, it is indeed possible for each of them (for example for each picture i) to obtain its average stepsize $Q_i$ and the number of bits $S_i$ used to compress this picture, and then to compute the complexity of the picture i, defined as:

$$X_i = Q_i S_i \tag{10}$$

This number, computed for the current picture by using an advanced information available at the input of the system, needs no longer to be estimated in the system itself.

The present invention is not limited to the described embodiments, from which modifications or improvements can be deduced without departing from the scope of the invention. For example, it is clear that the invention can be implemented either with the aid of wired electronic modules or under the form of implementations including a microprocessor which ensures the performance of series of instructions corresponding to the functions of some or all circuits in said embodiments.

We claim:

1. A system for transmitting a plurality of video programs simultaneously through a transmission channel having a predetermined total bitrate, comprising:

(a) in cascade a decoding assembly and an encoding assembly, said decoding assembly consisting of an identical plurality of decoding means provided in parallel for decoding n coded input signals corresponding to said programs and each comprising in cascade a demultiplexing circuit and a decoder, and said encoding assembly consisting of an identical plurality of encoding means being in cascade with said decoding means and each comprising in series a quantizer having a controllable step size and a variable length encoder;

(b) means for combining the output bitstreams of said encoding means to an output channel bitstream;

(c) control means for controlling respective step sizes of said plurality of encoding means in dependence upon the respective output bitrates of said encoding means; characterized in that:

said control means are also provided for controlling the output bitrates of said encoding means in dependence upon complexity values associated to the coded input signals of each decoding means with respect to the joint complexity of the plurality of said coded signals.

2. A system as claimed in claim 1, each picture of said video programs being, according to the MPEG standard, an intraframe coded or a predictively coded or a bidirectionally predictive coded picture, characterized in that it comprises a common bitrate adjusting circuit for applying a respective bitrate target value to each of the control means in dependence upon the complexities of the corresponding video programs, said adjusting circuit comprising computing means for gathering bitstreams and quantization parameters available in said input bitstreams and determining said complexities, a summing device for adding these complexities, dividers of each complexity by their sum, and multipliers of the obtained ratios by the channel bitrate computed for each of said three types of picture in said computing means, the respective outputs of said multipliers being the target values sent to said control means of each of said encoding means.

3. A system as claimed in claim 1, each picture of said video programs being, according to the MPEG standard, an intraframe coded or a predictively coded or a bidirectionally predictive coded picture, characterized in that it comprises a common bitrate adjusting circuit for applying a respective bitrate target value to each of the control means in dependence upon the complexities of the corresponding video programs, said adjusting circuit comprising computing means for gathering bitstreams and quantization parameters available at the outputs of said demultiplexing circuits and of said decoding devices and determining the complexity of each of said decoded signals, a summing device for adding these complexities, dividers of each complexity by their sum, and multipliers of the obtained ratios by the channel bitrate computed for each of said three types of picture in said computing means, the respective outputs of said multipliers being the target values sent to said control means of each of said encoding means.

* * * * *